(12) United States Patent
Heigl et al.

(10) Patent No.: US 11,180,105 B2
(45) Date of Patent: Nov. 23, 2021

(54) METHOD FOR FOLDING AN AIRBAG

(71) Applicant: TRW Automotive GmbH, Alfdorf (DE)

(72) Inventors: Jürgen Heigl, Böbigen (DE); Max Sadwornych, Aalen (DE)

(73) Assignee: TRW AUTOMOTIVE GMBH, Alfldorf (DE)

( * ) Notice: Subject to any disclaimer, the term of this patent is extended or adjusted under 35 U.S.C. 154(b) by 188 days.

(21) Appl. No.: 16/477,933

(22) PCT Filed: Jan. 11, 2018

(86) PCT No.: PCT/EP2018/050657
§ 371 (c)(1),
(2) Date: Jul. 15, 2019

(87) PCT Pub. No.: WO2018/134113
PCT Pub. Date: Jul. 26, 2018

(65) Prior Publication Data
US 2019/0366969 A1    Dec. 5, 2019

(30) Foreign Application Priority Data
Jan. 20, 2017   (DE) .......................... 102017101092.0

(51) Int. Cl.
*B60R 21/232*    (2011.01)
*B60R 21/237*    (2006.01)
(Continued)

(52) U.S. Cl.
CPC .......... *B60R 21/232* (2013.01); *B60R 21/237* (2013.01); *B60R 21/201* (2013.01);
(Continued)

(58) Field of Classification Search
CPC ... B60R 21/232; B60R 21/237; B60R 21/213; B60R 21/201; B60R 2021/0006; B60R 2021/161; B60R 2021/2375
See application file for complete search history.

(56) References Cited

U.S. PATENT DOCUMENTS 6,224,087 B1 *  5/2001  Stutz ..................... B60R 21/213
                                                         280/728.2
8,091,917 B2 *  1/2012  Weyrich ................ B60R 21/231
                                                         280/728.2
(Continued)

FOREIGN PATENT DOCUMENTS

JP    2013-52875      *  3/2013
JP    2013052875         3/2013
JP    2015039928 A    *  3/2015

*Primary Examiner* — Karen Beck
(74) *Attorney, Agent, or Firm* — Tarolli, Sundheim, Covell & Tummino LLP

(57) ABSTRACT

In a method of folding a curtain-type side airbag (10) into an elongate airbag package (12) defining a longitudinal direction (L), wherein the side airbag (10) at one longitudinal end includes an elongate inflatable extension (14) having a free end (34), in a first folding step the extension (14) is folded over at a first folding line (30) enclosing an angle (α) <90°, especially between 30° and 60°, with the longitudinal direction (L), and in a second subsequent folding step the free end (34) of the extension (14) is folded over at a second folding line (36), the second folding line (36) enclosing an angle (β) of 0 to 45°, especially 0°, with the longitudinal direction (L).

11 Claims, 3 Drawing Sheets

(51) Int. Cl.
  *B60R 21/201* (2011.01)
  *B60R 21/213* (2011.01)
  *B60R 21/00* (2006.01)
  *B60R 21/16* (2006.01)
  *B60R 21/231* (2011.01)

(52) U.S. Cl.
  CPC ....... *B60R 21/213* (2013.01); *B60R 21/23138* (2013.01); *B60R 2021/0006* (2013.01); *B60R 2021/161* (2013.01); *B60R 2021/2375* (2013.01)

(56) References Cited

U.S. PATENT DOCUMENTS

| | | | | |
|---|---|---|---|---|
| 8,091,918 B2* | 1/2012 | Mitchell | ............... | B60R 21/201 |
| | | | | 280/728.2 |
| 8,562,016 B2* | 10/2013 | Higano | ................. | B60R 21/213 |
| | | | | 280/730.2 |
| 9,802,567 B2* | 10/2017 | Oh | ........................ | B60R 21/235 |
| 9,809,190 B2* | 11/2017 | Mazanek | .............. | B60R 21/237 |
| 10,618,493 B2* | 4/2020 | Suzuki | .................. | B60R 21/213 |
| 10,807,554 B2* | 10/2020 | Floersheimer | ........ | B60R 21/214 |
| 2002/0027341 A1 | 3/2002 | Bakhsh et al. | | |
| 2003/0011175 A1* | 1/2003 | Hess | ................... | B60R 21/2338 |
| | | | | 280/730.2 |
| 2003/0155759 A1* | 8/2003 | Abe | ........................ | B60R 21/237 |
| | | | | 280/743.1 |
| 2005/0140125 A1 | 6/2005 | Noguchi et al. | | |
| 2005/0189745 A1* | 9/2005 | Tanaka | .................. | B60R 21/232 |
| | | | | 280/730.2 |
| 2009/0085330 A1* | 4/2009 | Ilda | ........................ | B60R 21/232 |
| | | | | 280/728.2 |
| 2009/0236827 A1* | 9/2009 | Abramczyk | .......... | B60R 21/232 |
| | | | | 280/728.1 |
| 2012/0306186 A1* | 12/2012 | Weyrich | ................ | B60R 21/235 |
| | | | | 280/743.1 |
| 2015/0191141 A1* | 7/2015 | Wang | .................... | B60R 21/216 |
| | | | | 280/730.2 |
| 2017/0253211 A1* | 9/2017 | Choi | ...................... | B60R 21/232 |
| 2018/0290618 A1* | 10/2018 | Floersheimer | ........ | B60R 21/214 |
| 2019/0001913 A1* | 1/2019 | Okuhara | ............... | B60R 21/232 |
| 2019/0092265 A1* | 3/2019 | Kakimoto | ............. | B60R 21/232 |
| 2019/0126882 A1* | 5/2019 | Hayashi | ............... | B60R 21/2342 |
| 2020/0031307 A1* | 1/2020 | Hill | ....................... | B32B 5/024 |
| 2021/0001798 A1* | 1/2021 | Moran | ................ | B60R 21/2346 |

* cited by examiner

METHOD FOR FOLDING AN AIRBAG

RELATED APPLICATIONS

This application corresponds to PCT/EP2018/050657, filed Jan. 11, 2018, which claims the benefit of German Application No. 10 2017 101 092.0, filed Jan. 20, 2017, the subject matter of which are incorporated herein by reference in their entirety.

BACKGROUND OF THE INVENTION

The invention relates to a method of folding a curtain-type side airbag.

Curtain-type side airbags are mounted on a roof rail of a passenger car as a protection against lateral impact. They may extend substantially over the entire side of the vehicle, from the A pillar to the C pillar or else a portion therebetween.

In order to cover e.g. the C pillar behind the vehicle occupants on the backseat, side airbags are known which in the inflated state have an end portion that is freely suspended and not fixed directly to the vehicle. Said end portion is folded together with the remaining airbag and is deployed by the inflowing filling gas and is brought into its final position.

SUMMARY OF THE INVENTION

It is the object of the invention to ensure quick and reproducible deployment into the final position for such side airbag.

This object is achieved by a method of folding a curtain-type side airbag into an elongate airbag package, wherein the folded elongated and not mounted airbag package defines a longitudinal direction and the side airbag at one longitudinal end includes an elongate inflatable extension having a free end. In one folding step, the extension is folded over at a first folding line which encloses an angle <90°, especially an angle between 90° and 60° with the longitudinal direction. In the following folding step, the second end of the extension is folded over at a second folding line, the second folding line enclosing an angle from 0 to 45°, especially 0°, with the longitudinal direction. In this way, the extension can be folded so that it is combined in a small compact sub-package which can deploy upon filling the side airbag without being obstructed e.g. by vehicle parts.

In the second folding step, advantageously the extension is partly folded back to a part of the extension folded over in the first folding step so that a sub-package comprising merely parts of the extension is formed. In an especially preferred orientation of the two folding lines at an angle of 45° and 0° an especially compact sub-package is thus formed.

The first folding line is preferably located inside the surface area of the inflatable extension when the side airbag is flatly spread. Hence, in this folding step exclusively the extension is folded without any further parts of the side airbag being involved.

The second folding line is preferably located on an upper edge of the flatly spread, i.e. unfolded, side airbag or in parallel thereto, depending on the direction in which the first folding step is carried out.

Folding over the extension along the first folding line may be performed either in the direction of the upper edge of the side airbag or in the direction of the lower edge of the side airbag, wherein preferably the subsequent folding steps is carried out in the respective inverse direction, i.e. the free end of the extension is folded over in the direction of the lower or upper edge of the side airbag. If, for example, the extension extends in parallel to the longitudinal direction of the airbag package, when the airbag is spread and not inflated, and if an angle of 45° is selected for the first folding line and an angle of 0° is selected for the second folding line, then the directions into which the extension is folded over differ by 180° in the first and second folding steps.

However, the method is also applicable to side airbags having an extension which does not extend exactly in parallel to the longitudinal direction of the airbag package, wherein e.g. the orientation of the first and second folding lines can be adapted to a certain extent to fold the extension into a compact sub-package.

The folded portion of the extension usually projects from the surface area of the spread side airbag at least after the first folding step and optionally also after the second folding step, which, of course, also depends on the total length of the extension to the free end thereof and on the distance of the first folding line from the free end of the extension.

After the two afore-described folding steps, the extension of the side airbag folded to form the sub-package may be shorter in the longitudinal direction than the flatly spread extension, thus facilitating positioning of the extension when the side airbag is being filled.

The two folding steps described so far about the first and second folding lines may be the only folding steps which comprise exclusively the extension of the side airbag.

After the two afore-described folding steps having been carried out, the side airbag may be furled in another folding step in parallel to the longitudinal direction, for example, as this is common practice when folding side airbags. In general, in this application a "folding step" is basically understood to be also a furling of portions of the side airbag.

Of preference, the side airbag has a continuous inflatable upper compartment extending at an upper edge of the side airbag in parallel to the longitudinal direction. The side airbag is preferably folded and furled so that the inflatable upper compartment remains adapted to be partly filled with gas in order to enable filling gas to quickly flow into all inflatable parts of the side airbag when filling the airbag.

After the partial furling, in another folding step the side airbag may be folded over about a folding line in parallel to the longitudinal direction by 180° at the end comprising the extension. This is especially favorable when the extension is relatively long, as usually no means for the fastening to the extension are provided at the free end of the extension. By folding the total length of the airbag package is reduced in the longitudinal direction so that the airbag package can be disposed more easily at the roof rail.

Folding is preferably performed downwards, i.e. to the side of the side airbag away from the upper edge and thus also away from the vehicle attachments.

The folded portion may comprise, apart from the extension, also part of the curtain-type inflatable portion of the side airbag. However, preferably the sub-package formed by the folded extension in the first and second folding steps is completely folded over as well.

The folding steps relating to the extension in fact may be the first folding steps when the side airbag is being folded, but it is also possible to carry said steps out at an appropriate point in the course of folding and to fold other portions of the side airbag which do not contact the folding of the extension before. Partially, this application makes use of the term "first and second folding steps", which is merely intended to improve clarity.

BRIEF DESCRIPTION OF THE DRAWINGS

Hereinafter, the invention is described in detail by way of an example embodiment with reference to the enclosed drawings, wherein.

DESCRIPTION

The figures are successive folding steps in a method of folding a curtain-type side airbag 10.

Figure 6:
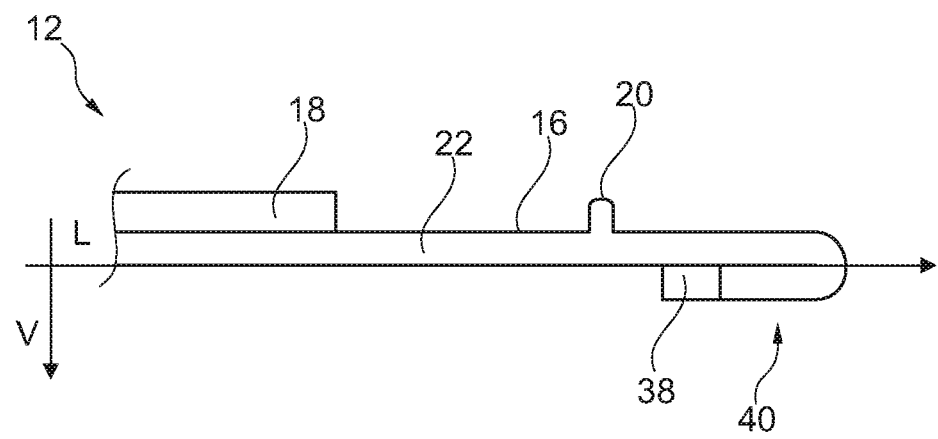
FIG. 6 shows the partly folded side airbag of FIG. 5 after the free end comprising the extension has been folded over.

The side airbag 10 is disposed, prior to deployment and filling thereof, at a roof rail of a passenger car, viz. in the form of a folded airbag package 12, as schematically shown in FIG. 6. The side airbag 10 may extend, in the filled state, over one or more of the vehicle pillars and may reach e.g. from the A pillar to the C pillar.

Figure 1:
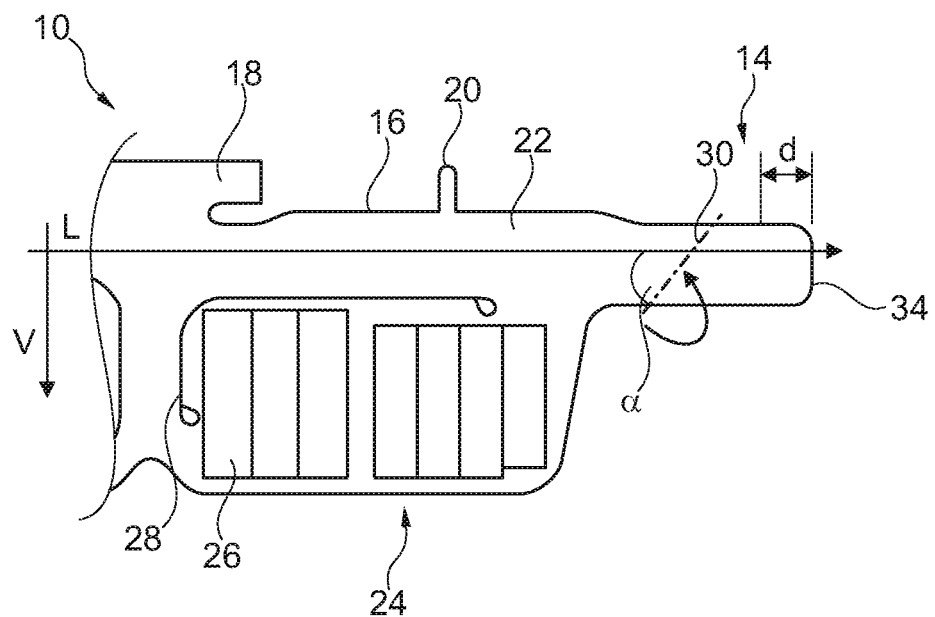
FIG. 1 shows a cutout of a side airbag in a schematic representation, comprising an inflatable extension having a free end in the completely flatly spread state.

FIG. 1 shows a cutout of the side airbag 10 in a non-filled flatly spread state. One of the lateral ends of the side airbag 10 ending in an inflatable elongate extension 14 is shown. It is noted that in this example an extension 14 is shown only for the one lateral end of the side airbag 10, although it would be imaginable to provide such extension 14, though in mirrored arrangement, also at the other end (not shown) of the side airbag 10.

A longitudinal direction L is defined by the longitudinal direction of the completely folded expanded and not mounted airbag package 12 in FIG. 6 and extends at least approximately in parallel to an upper edge 16 of the side airbag 10. Of course, the upper edge 16 follows, to a certain extent, the contour of a roof rail on which the airbag package 12 is finally mounted and, in addition, has certain steps, for example due to an inflation mouth 18 at which an inflator (not shown) supplying the filling gas required for inflation is disposed. Nevertheless, the upper edge 16 of the airbag predefines at least approximately a continuous direction.

Along the upper edge 16, plural fastening portions 20 are formed via which the side airbag 10 is tightly connected to the vehicle and which remain tightly connected to the vehicle even in the inflated and deployed state. Said fastening portions 20 also protrude from the completely folded airbag package 12 so that the airbag package 12 can be fastened (see FIG. 6, for example).

The extension 14 is hose-shaped and has a significantly smaller extension in a vertical direction V normal to the longitudinal direction L than a portion of the side airbag 10 connected thereto.

In the area of the extension 14 no fastening portion 20 is provided, but in the inflated state the extension 14 extends freely within the vehicle and within the vehicle automatically adopts its position during the filling of the side airbag 10 without being backed by any fasteners or other active means in the area of the extension 14. The extension 14 may be used, for example, for covering in portions a C pillar or else an A pillar of the vehicle.

In this example, the reach of the extension 14 approximately follows the longitudinal direction L. It would also be possible, as a matter of course, for the extension 14 e.g. to take a slightly curved shape which deviates away from the upper edge 16 (downwards in the mounted state) from the longitudinal direction L.

In this case, the extension 14 merges with a slight widening of the diameter into an upper inflatable compartment 22 which may extend along the entire upper edge 16 of the side airbag 10 and which serves for distributing the filling gas flowing in through the inflation mouth 18.

Moreover, the side airbag 10 has a curtain-type portion 24 which is provided, in the inflated state, e.g. in the area of the side windows and the B pillar. The curtain-type portion 24 has plural inflatable compartments 26 and is additionally structured by non-inflatable partitions 28, as this is conventionally known. In the vertical direction V, the curtain-type portion 24 extends along a definitely longer length than the extension 14, for example by a factor 2 to 4.

In order to fold the side airbag 10 into the airbag package 12 shown in FIG. 6, plural successive folding steps are carried out. The here described folding steps for folding the extension 14 may be carried out at any appropriate point in time while folding the entire side airbag 10 at a skilled person's discretion.

Figure 2:
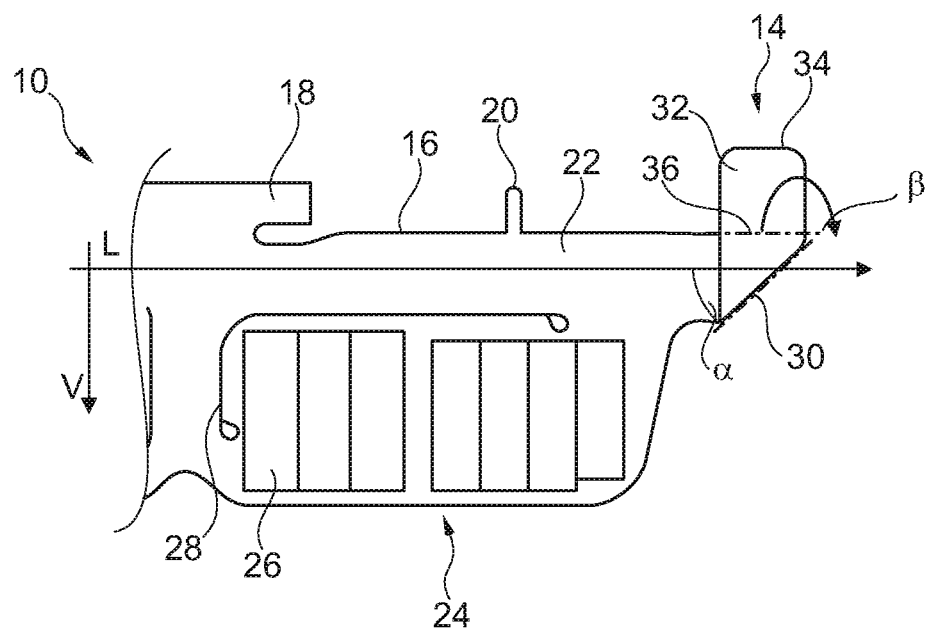
FIG. 2 shows the side airbag of FIG. 1 after a first folding step.

In a first folding step, the extension 14 is folded over at a first folding line 30, as is evident from FIG. 2.

In this case, the first folding line 30 is located, relating to the longitudinal direction L, approximately in the middle of the extension 14 and on the surface area of the extension 14. In this example, the first folding line 30 is inclined at an angle α of 45° vis-à-vis the longitudinal direction L. The angle α between the folding line 30 and the longitudinal direction L opens toward the curtain-type portion 24 of the side airbag 10.

Due to this arrangement, the extension 14 is folded upwards beyond the upper edge 16, with the folded portion 32 of the extension 14 comprising a free end 34 of the extension 14 now extending in the vertical direction V and projecting from the surface area of the remaining side airbag 10.

In a second folding step, the free end 34 of the extension 14 now is repeatedly folded over along a second folding line 36, namely such that it comes to rest partially on the already folded portion of the extension 14. In this way, a sub-package 38 in which the major part of the extension 14 is folded and which comprises three superimposed layers of the extension 14 that are superimposed in zigzag shape is formed.

The second folding line 36 in this case extends along the upper edge 16 of the side airbag 10 and thus encloses an angle β of 0° with the longitudinal direction L.

Figure 3:
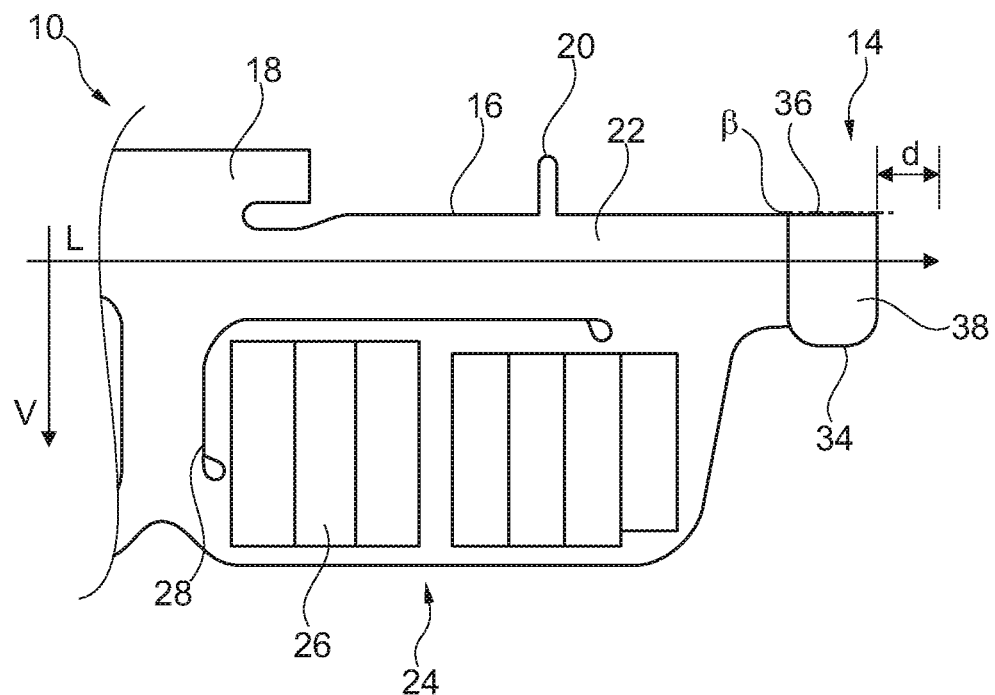
FIG. 3 shows the side airbag of FIG. 1 after a second folding step.

Since the second folding line 36 coincides with the upper edge 16, the sub-package 38 formed by the second folding step ends flush with the upper edge 16 (see FIG. 3). The free end 34 of the extension 14 in this example slightly protrudes from the remaining extension 14 in the vertical direction V on the side facing away from the upper edge 16, however.

The length of the side airbag 10 is reduced by the folding in the area of the extension 14 by an amount d (see FIGS. 1 and 3) which depends on the position of the first folding line 30 along the longitudinal direction L and the contour of the extension 14 along the vertical direction V.

The folding lines 30, 36 might as well extend at different angles, wherein a merely minor deviation from the said and described angles is of advantage to obtain a compact sub-package 38.

In a possible alternative, of course the first folding line 30 might extend being rotated about 90° so that in the first folding step the extension 14 is not folded upwards beyond the upper edge 16 but downwards, whereas then in the second folding step the free end 34 of the extension 14 is not folded vertically downwards away from the upper edge 16 but toward the upper edge 16. However, in such case it should have to be observed that possibly a third folding step is carried out which again folds back the free end 34 of the extension 14 projecting from the upper edge 16 into the area of the side airbag 10 again so as to obtain a uniform end of the airbag package 12.

Figure 4:
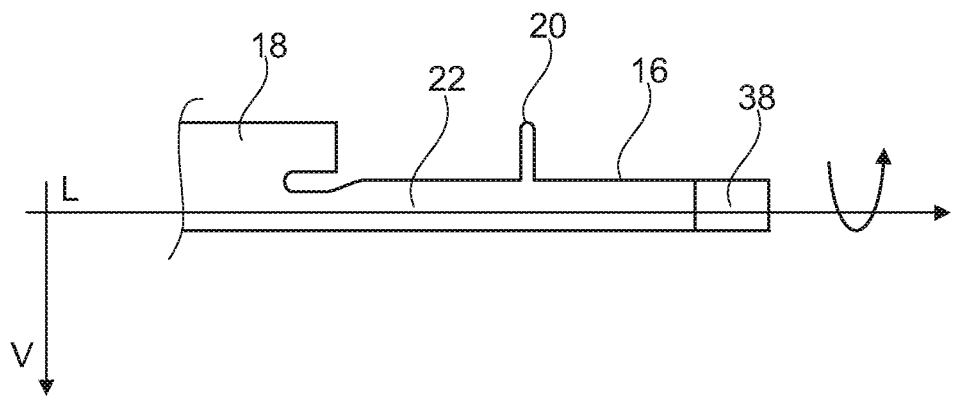
FIG. 4 shows the side airbag of FIG. 1 after partly furling the side airbag.
Figure 5:
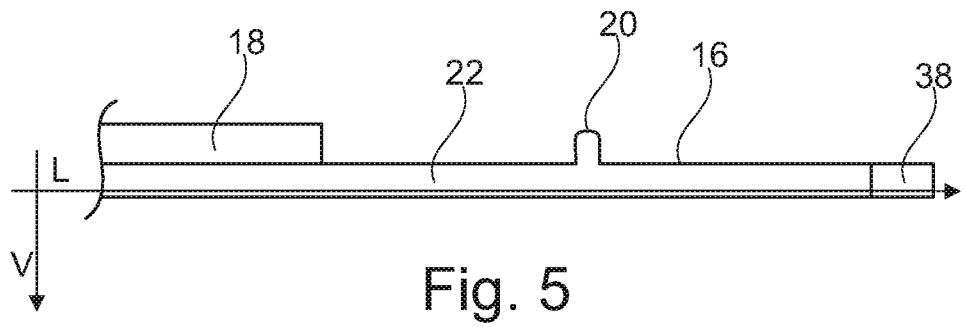
FIG. 5 shows the side airbag of FIG. 4 after furling is completed.

After having folded the extension 14 into the sub-package 38, in another folding step the side airbag 10, especially the curtain-type portion 24 as well as possibly a portion of the sub-package 38 is furled from the bottom in the vertical direction V, as this is illustrated in FIGS. 4 and 5.

In a further folding step, now an end portion 40 of the partially folded side airbag 10 comprising the extension 14 and, resp., the sub-package 38 is folded in parallel to the longitudinal direction L by 180° so that the reach of the folded side airbag 10 is further shortened in the longitudinal direction L. This completely folded airbag package 12 in its final shape in which it can be mounted on the vehicle is illustrated in FIG. 6.

Upon deployment of the side airbag 10, filling gas flows through the upper inflatable compartment 22 into the airbag package 12 and is distributed along the upper edge 16 of the side airbag 10 and initially ensures that the end portion 40 folded over in the last folding step will expand. In this way, the extension 14 at least the majority of which is still folded in the sub-package 38 already substantially reaches its final position within the vehicle, wherein it passes possible obstacles within the vehicle such as seat belts or headrests without being obstructed by the latter.

From this point in time, filling gas may also flow into the sub-package 38 and deploy the same, and the extension 14 adopts its final shape and position within the vehicle.

The invention claimed is:

1. A method of folding a curtain-type side airbag into an elongate airbag package which defines a longitudinal direction, wherein the side airbag at one longitudinal end includes an elongate inflatable extension having a free end, during a folding step the extension being folded at a first folding line enclosing an angle with the longitudinal direction and during a subsequent folding step the free end of the extension being folded over at a second folding line, wherein the second folding line encloses an angle of 0 to 30°, with the longitudinal direction, wherein the second folding line is located on an upper edge or in parallel to the upper edge of the flatly spread side airbag; wherein the angle α is between 30° and 60°.

2. The method according to claim 1, wherein the extension in the second folding step is partly folded back onto a part of the extension folded over in the first folding step.

3. The method according to claim 1, wherein the first folding line is located within the surface area of the inflatable extension when the side airbag is flatly spread.

4. The method according to claim 1, wherein after the first folding step and/or after the second folding step a folded portion of the extension projects from the surface area of the flatly spread remaining side airbag.

5. The method according to claim 1, wherein, after the two folding steps, the extension folded into a sub-package is shorter in the longitudinal direction than the flatly spread extension.

6. The method according to claim 1, wherein folding about the first and second folding lines are the only folding steps which exclusively comprise the extension.

7. The method according to claim 1, wherein, after the two folding steps, the side airbag is furled in parallel to the longitudinal direction during another folding step.

8. The method according to claim 1, wherein the side airbag has a continuous inflatable upper compartment extending at an upper edge of the side airbag in parallel to the longitudinal direction, and in that the side airbag is folded and furled so that the upper inflatable compartment remains adapted to be partly filled with gas.

9. The method according to claim 1, wherein during another folding step the end of the side airbag comprising the extension is folded over by 180° in parallel to the longitudinal direction.

10. The method according to claim 1, wherein the extension substantially extends in the longitudinal direction.

11. The method according to claim 1, wherein a total vertical length of the side airbag is smaller at the extension than at any other longitudinal portion of the side airbag.

* * * * *